UNITED STATES PATENT OFFICE.

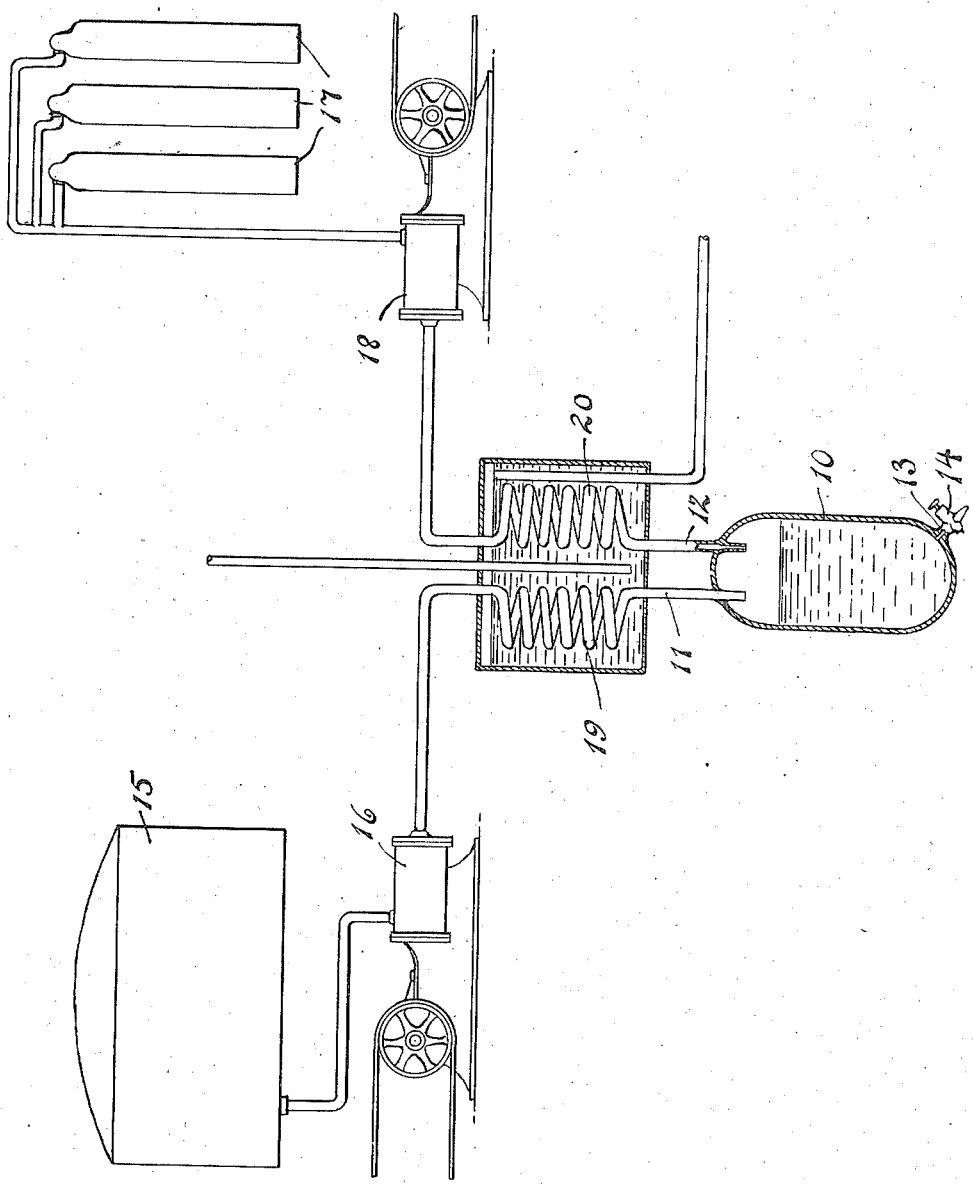

GEORGE O. CURME, JR., OF PITTSBURGH, PENNSYLVANIA, ASSIGNOR, BY MESNE ASSIGNMENTS, TO UNION CARBIDE COMPANY, OF NEW YORK, N. Y., A CORPORATION OF VIRGINIA.

PROCESS OF PREPARING ETHYLENE DICHLORID FROM ETHYLENE.

1,315,545.             Specification of Letters Patent.      Patented Sept. 9, 1919.

Original application filed June 3, 1916, Serial No. 101,637. Divided and this application filed October 2, 1916, Serial No. 123,414. Renewed December 12, 1917. Serial No. 206,851.

*To all whom it may concern:*

Be it known that I, GEORGE O. CURME, Jr., a citizen of the United States, residing at Pittsburgh, Allegheny county, and State of Pennsylvania, have invented and discovered certain new and useful Improvements in Processes of Preparing Ethylene Dichlorid from Ethylene, of which the following is a specification.

As is well known, in order to prepare ethylenedichlorid from ethylene, it is only necessary to bring the ethylene and chlorin together; under almost any conditions a reaction proceeds as per the equation $$C_2H_4 + Cl_2 \rightarrow C_2H_4Cl_2.$$

However, under all conditions, this reaction does not run rapidly and smoothly, with formation of a pure end-product. I have found that an especially favorable set of conditions for bringing about this reaction is obtained when conditions are chosen such as to present the chlorin in the liquid phase to the action of the ethylene in the liquid phase. The chlorin can be liquefied by sufficient compression or by sufficient reduction of temperature, or by both expedients applied at once. The ethylene can be liquefied in a similar manner.

My present invention consists, therefore, in the process for preparing ethylenedichlorid by the chemical union of ethylene and chlorin which are both in the liquid condition, this application being a division of my application No. 101,637.

The accompanying drawing, which is made a part hereof, illustrates an apparatus such as has been found appropriate for the practice of said process, although the successful application of the process is not dependent on using this exact apparatus and must be varied as liquid ethylene is added to the liquid chlorin, or vice versa, or both added simultaneously, as hereafter described.

The said apparatus consists of a vessel 10, with an inlet pipe 11 for liquid ethylene and an inlet pipe 12 for the liquid chlorin, leading into the upper portion of said vessel, and an outlet pipe 13, with a valve 14, leading from the bottom of said vessel. An ethylene supply tank 15, compressor 16, a chlorin supply, comprising a battery of cylinders 17, a compressor 18, and condenser coils 19 and 20 for the ethylene and chlorin pipes, respectively, complete the apparatus.

It will be understood that this merely illustrates an arrangement such as has been found practicable, but may be varied in any appropriate manner, for example, the process easily lends itself to an arrangement for continuous operation.

The operation here given consists in liquefying both ethylene and chlorin at a pressure greater than the vapor pressure exerted by the ethylene in the vessel 10 at the temperature used, and bringing the two together in the proper proportions. This, then, permits of a complete and rapid union of the ethylene and the chlorin immediately upon mixing of the two liquids, giving pure ethylenedichlorid. The ethylene and chlorin are continuously added in molecularly equivalent quantities. If both substances are pure, no residue other than pure ethylenedichlorid remains; the pure ethylenedichlorid, a liquid, is drawn off through outlet pipe 13 controlled by valve 14.

Naturally, as soon as the process has proceeded a short time, the liquid content of vessel 10 contains both liquid chlorin, liquid ethylene, and ethylenedichlorid, which are mutually soluble in each other. This gives the same result as though a mixture of ethylenedichlorid and liquid chlorin (or ethylenedichlorid and ethylene) were used at the start, and, indeed, such may be done with equally good results, or an inert liquid, mixed with the liquid chlorin (or liquid ethylene) may be used which later can be separated from the ethylenedichlorid.

Having thus fully described my said invention, what I claim as new and desire to secure by Letters Patent, is:

1. The process of producing ethylenedichlorid which consists in combining ethylene and chlorin both in liquid condition, substantially as set forth.

2. The process of producing ethylenedichlorid which consists in liquefying the chlorin and ethylene and combining them in liquid form, substantially as set forth.

In witness whereof, I have hereunto set my hand and seal at Washington, District of Columbia, this sixth day of September, A. D. nineteen hundred and sixteen.

GEORGE O. CURME, Jr. [L. S.]

Witnesses:
E. W. BRADFORD,
E. S. CLEMENTS.